J. F. DORNFELD.
MALT TURNING MACHINE.
APPLICATION FILED JULY 22, 1912.
1,066,088.
Patented July 1, 1913.
6 SHEETS—SHEET 2.
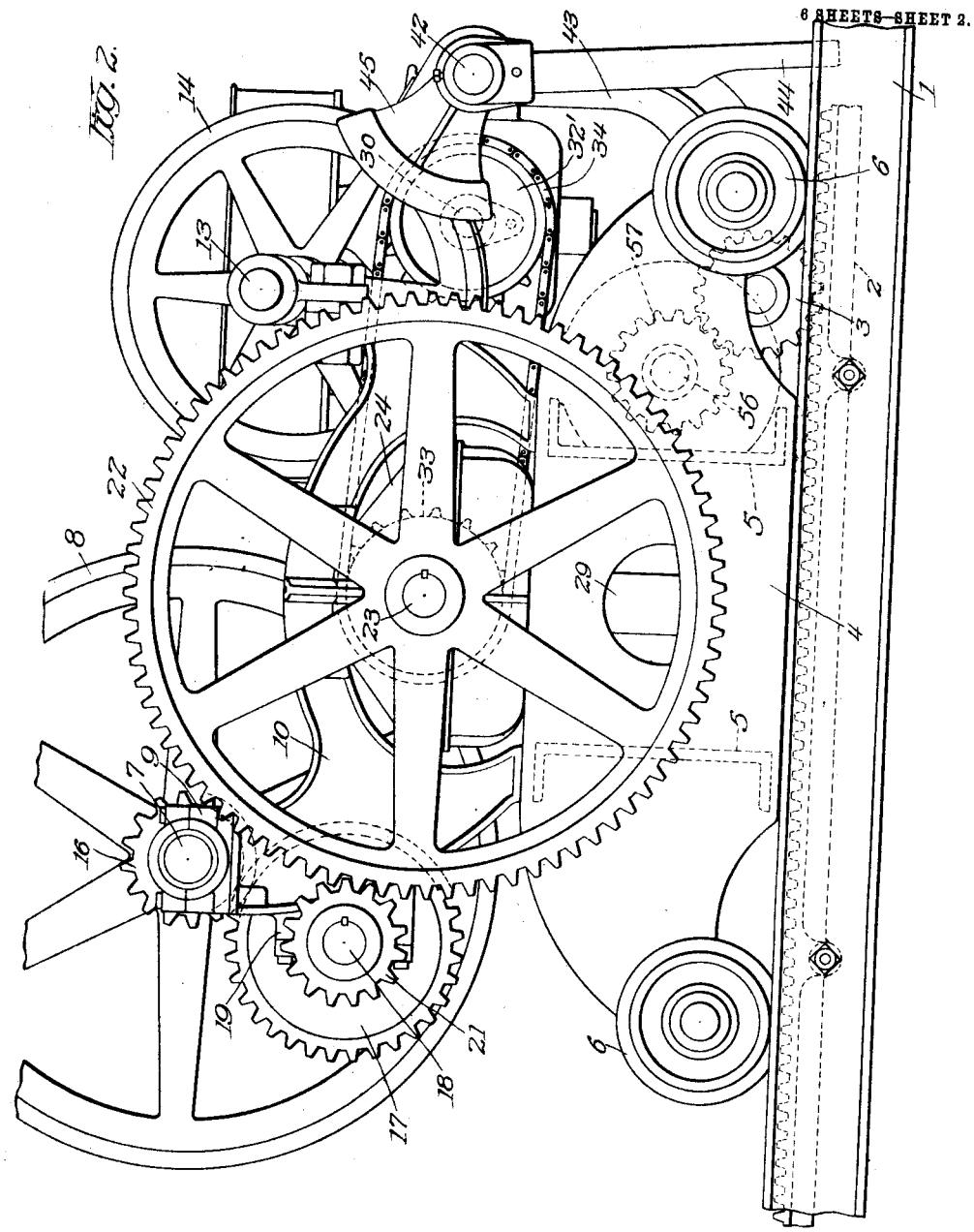
Witnesses:
Robert F. Weir
Arthur Carlson
Inventor:
John F. Dornfeld.
by Rudolph Wm. Lotz Atty.

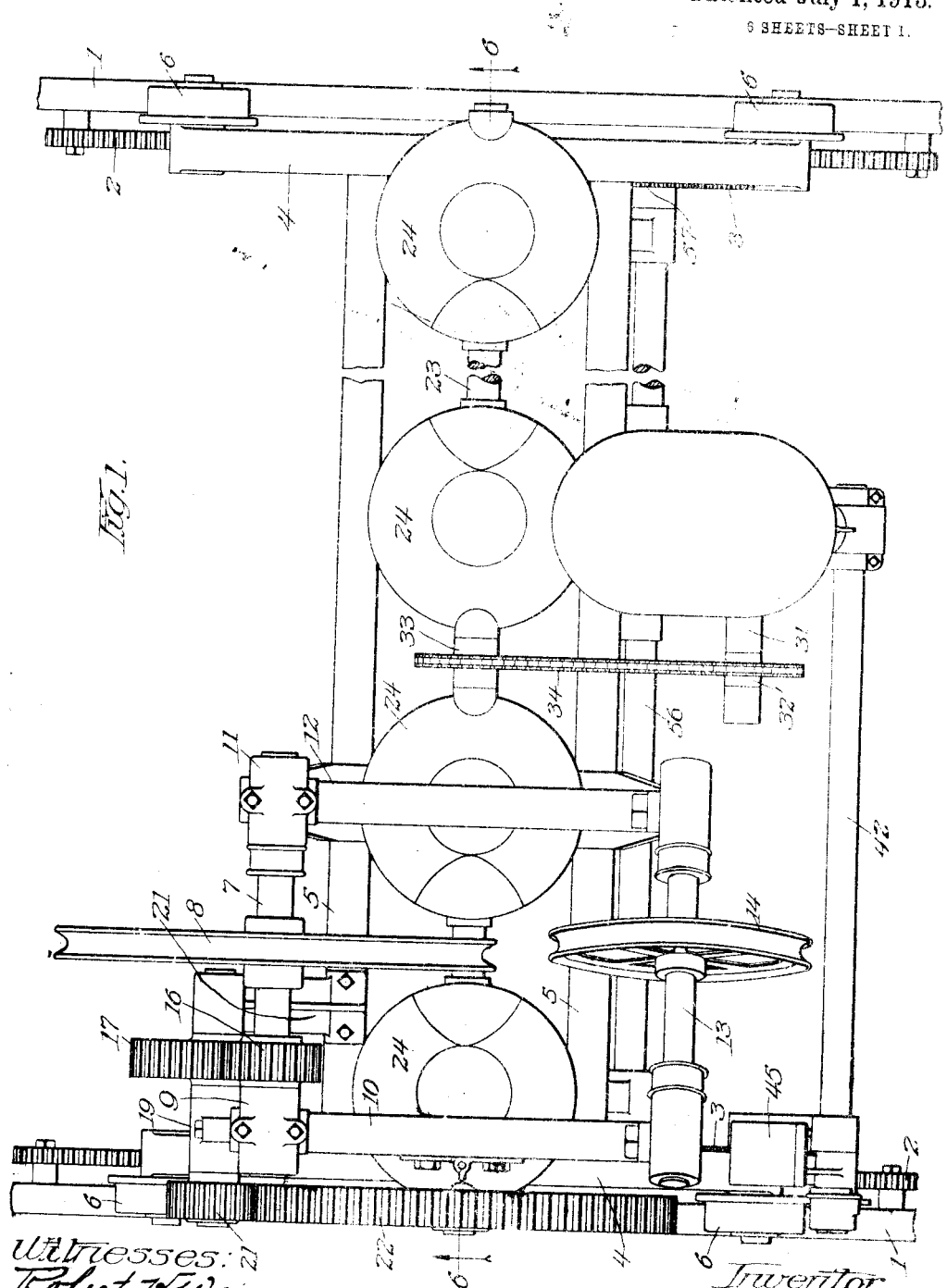
J. F. DORNFELD.
MALT TURNING MACHINE.
APPLICATION FILED JULY 22, 1912.
1,066,088.
Patented July 1, 1915.
6 SHEETS—SHEET 1.

J. F. DORNFELD.
MALT TURNING MACHINE.
APPLICATION FILED JULY 22, 1912.
1,066,088.
Patented July 1, 1913.
6 SHEETS—SHEET 3.
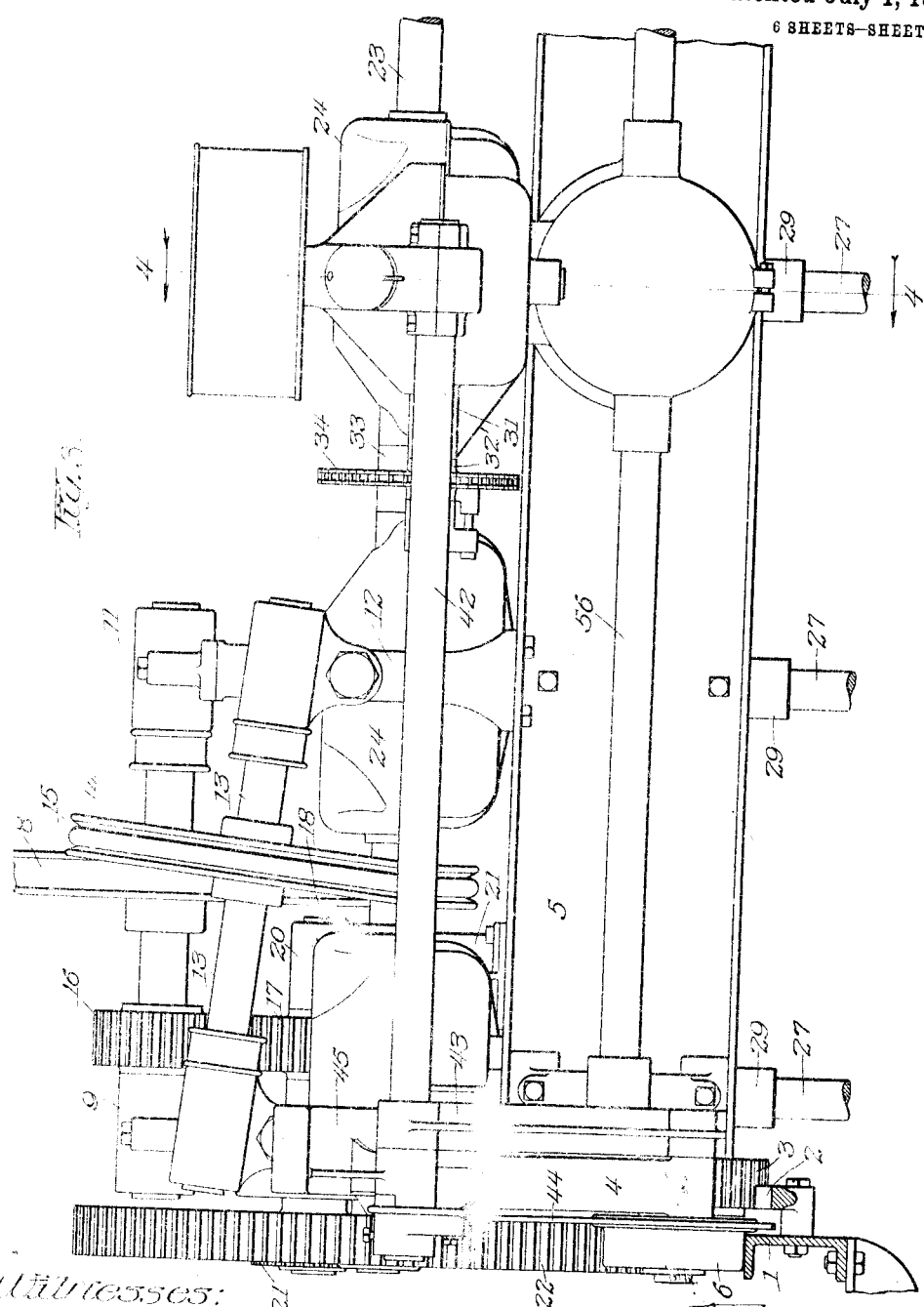
Witnesses:
Robert F. Weir
Arthur Carlson
Inventor
John F. Dornfeld.
by Rudolph Wm. Lotz
Atty.

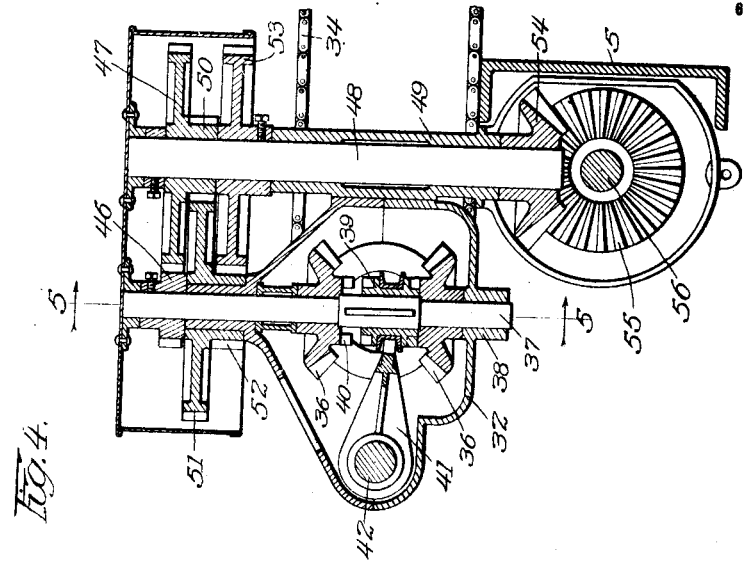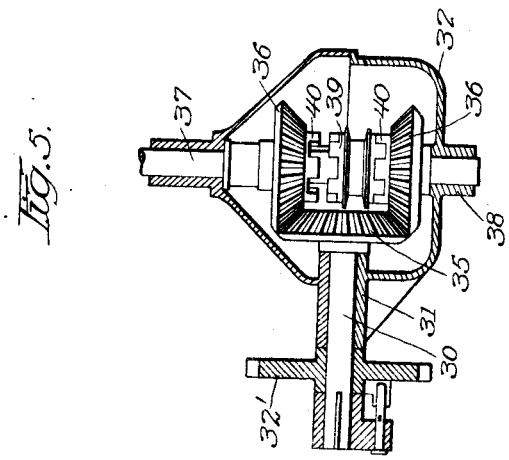

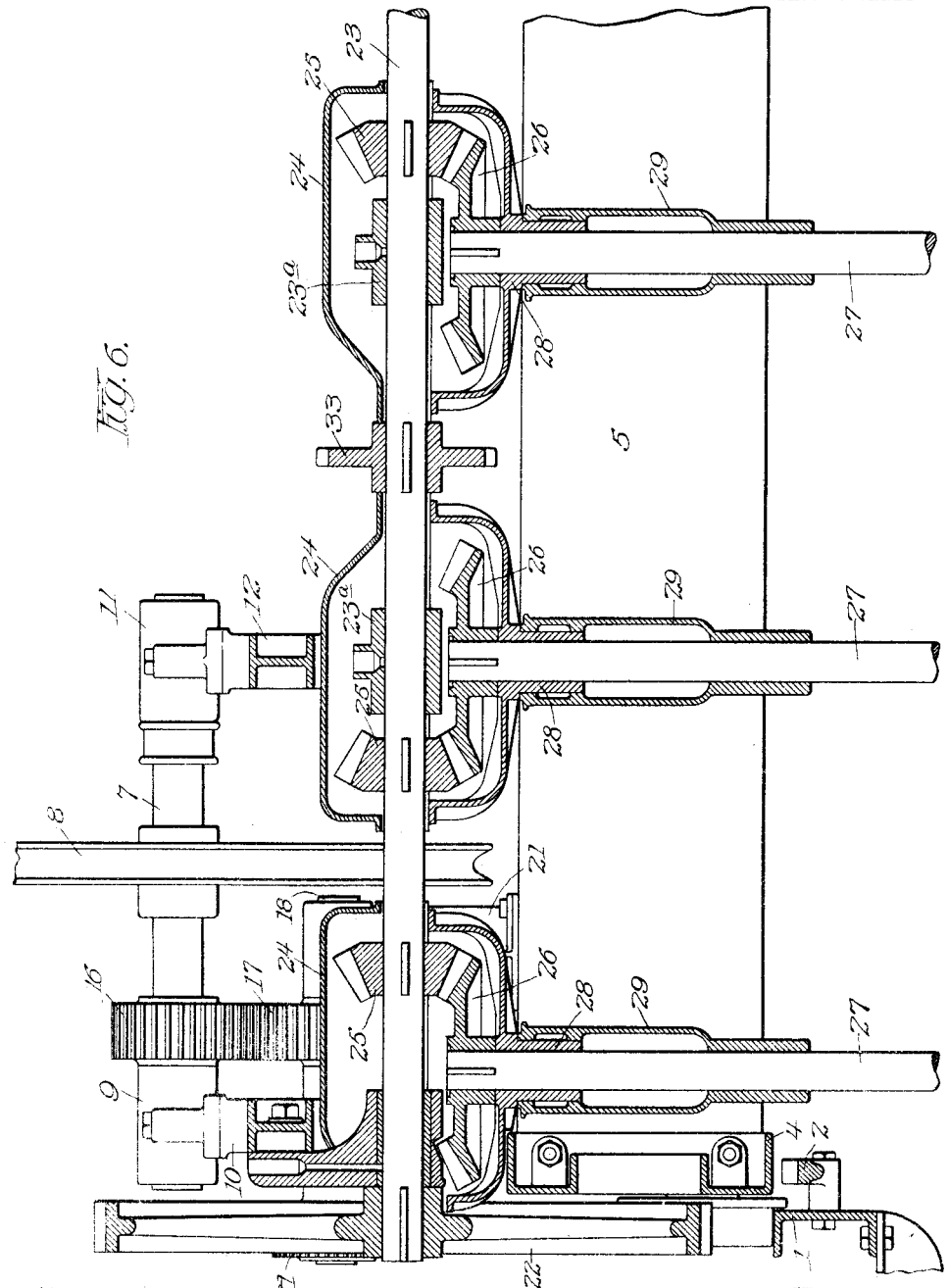

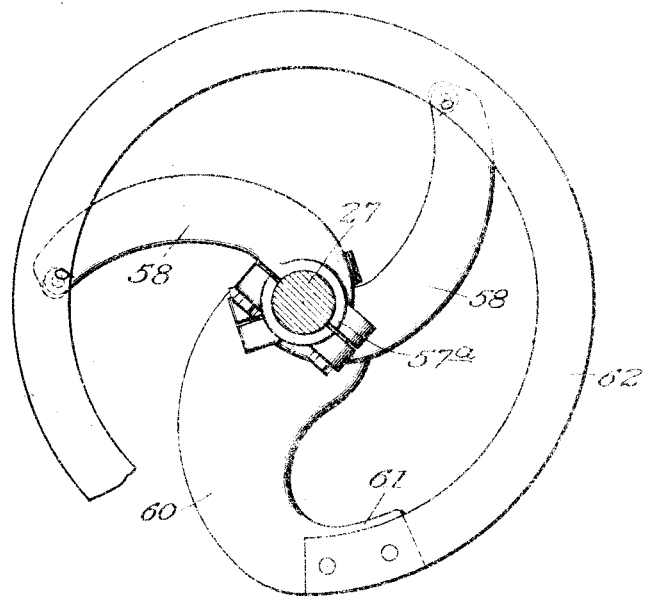
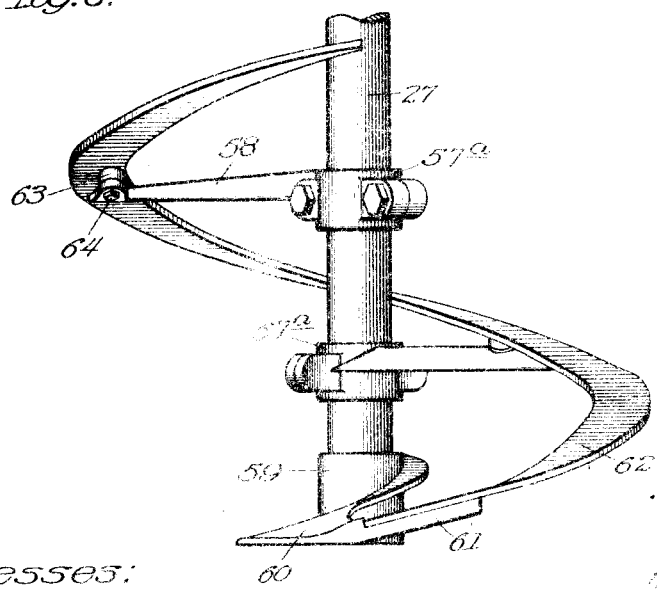

UNITED STATES PATENT OFFICE.

JOHN F. DORNFELD, OF CHICAGO, ILLINOIS.

MALT-TURNING MACHINE.

1,066,088.   Specification of Letters Patent.   Patented July 1, 1913.

Application filed July 22, 1912. Serial No. 710,967.

*To all whom it may concern:*

Be it known that I, JOHN F. DORNFELD, a citizen of the United States, residing at Chicago, in the county of Cook and State of Illinois, have invented certain new and useful Improvements in Malt-Turning Machines; and I do hereby declare the following to be a full, clear, and exact description of the invention, such as will enable others skilled in the art to which it appertains to make and use the same.

This invention relates to improvements in malt turning machines particularly adapted for use in malt houses of the type known as the Saladin, and has for its object to provide a simple and efficient machine of this character adapted to stir and turn over malt contained in the malting compartments.

The invention consists in the features of construction and combinations of parts hereinafter fully described and particularly claimed.

In the accompanying drawings illustrating the invention: Figure —1— is a plan view of a malt turning machine constructed in accordance with my invention. Fig. —2— is an end elevation of the same. Fig. —3— is a fragmentary front elevation of the same. Fig. —4— is a detail vertical transverse section of the same on the line 4—4 of Fig. —3—. Fig. —5— is a detail vertical section on the line 5—5 of Fig. —4—. Fig. —6— is a vertical transverse section of the machine on the line 6—6 of Fig. —1—. Fig. —7— is a top plan view of a helix employed. Fig. —8— is a side elevation of said helix.

The invention relates more particularly to certain details of construction of the machine and to improvements in the helix actuated thereby for turning the malt during travel of the machine in the compartment as will particularly appear from the following specification.

On the side walls of the malting compartments of pneumatic malt houses of the Saladin type, the construction of which are well-known, there are mounted two rails consisting preferably of channel bars upon which the carriage of the malt turning machine is supported in travel. The said channel bars carry rack bars over their entire length which are adapted to be engaged by spur pinions carried by the machine for causing the latter to travel thereon. In the drawings the channel bars referred to are indicated at 1 and the rack bars at 2, the latter being engaged by the spur pinions or gears 3 of the malt turning machine. The latter comprises a carriage consisting of end plates 4 which are connected together by means of channel bars 5 disposed parallel with each other and suitably secured to said end plates. Each of the end plates carries two wheels 6 rotatably mounted on studs carried thereby and which travel upon the upper flanged edges of the channel bars 1. The drive shaft 7 of the machine, carrying the sheave 8, is journaled in a bearing 9 on the arm of a standard 10 at one end and at its other end in a bearing 11 in the standard 12 supported at its ends upon the upper edges of the channel beams 5 constituting part of the frame or carriage of the machine. Similarly supported in bearings carried by the said standards 10 and 12 is the inclined countershaft 13 carrying a sheave 14, one portion of the periphery of which is disposed in horizontal alinement with the periphery of the sheave 8 and over which the rope or cable 15 is trained, the said sheave 14 being idle and adapted to permit the said drive rope or cable 15 to pass the sheave 8 laterally thereof in a well-known manner. The said shaft 7 carries a spur pinion 16 which meshes with the spur gear 17 on a countershaft 18 journaled in bearings 19 of the standard 10 and a bearing 20 in a standard 21 supported on one of said channel beams 5. Rigid with said countershaft 18 is a spur pinion 21 which meshes with the spur gear 22 carried by the shaft 23 journaled in a bearing carried by said standard 10 and in bearings carried by a plurality of boxes or gear cases 24 disposed at intervals between the end plates of the machine. Rotatably rigid with said shaft 23 and disposed in each of said gear cases 24 is a bevel pinion 25 which meshes with the bevel gear 26 rigidly disposed on a vertical shaft 27 carrying one of said helices which will be hereinafter fully described. The said shaft 27 is journaled in a bearing 28 carried by and integral with the lower wall of one of said gear boxes 24 and in a bearing 29 carried by and disposed between the channel bars 5, said last-named bearing receiving at its upper end the bearing 28 for purposes which will be hereinafter fully described. The said bevel pinions 25 are so disposed relative to the several bevel gears as to drive alternate shafts 27 in respectively opposite directions, the helices carried by said shafts being disposed respectively right and left in the manner of right and left screw threads. The shaft 23 is journaled in bearings 23ª carried by said boxes 24, the said boxes being so formed at their ends as to permit said shaft 23 limited movement to enable the same to yield to a limited extent to relieve the same of excessive strains. That is to say the shaft 23 is free to yield slightly laterally about a fulcrum coinciding with the axes of the shafts 27 when the helices carried by the latter encounter more than ordinary resistance, as in starting.

It will be noted from the foregoing that the train of gears heretofore described serves to rotate only the shafts 27 and the helices carried thereby, but has no effect upon the travel of the carriage of the machine upon the channel bars 1. The gearing for causing travel of the latter will be now particularly described.

Disposed parallel with the shaft 23 is a countershaft 30 journaled in a bearing 31 carried by a gear box 32 suitably supported upon the carriage. Said shaft 30 carries a sprocket 32' over which and a sprocket 33 on the shaft 23 a sprocket chain 34 is trained. The said shaft 30 carries a bevel gear 35 which meshes with two bevel gears 36 on a vertical shaft 37 journaled in bearings 38 in said gear box 32. The said bevel gears 36 are loosely mounted on said shaft 38, the latter carrying between said bevel gears a clutch 39 which is slidable thereon but rotatably rigid therewith. Said clutch r ay be of any desired pattern adapted for the purpose but in the instance illustrated is of the toothed type and is adapted to engage in the toothed clutch members 40 carried by said respective gears 36. A lever 41 carried by a horizontal shaft 42 engages said clutch member 39 and serves to throw the same into engaging relation to either of said clutch members 40 carried by the gears 36. The said shaft 42 is journaled at one end in a bearing carried by said gear box 32 and in its other end in a bearing supported in an arm 43 of one of said end plates 4. Contiguous to the last-named bearing said shaft carries a lever 44 by means of which it is turned to throw said clutch 31 into and out of engagement with said respective clutch members 40 of said gears 36. A weight 45 is carried by said shaft 42 and is capable of limited rotation relatively thereto, said weight being adapted to be thrown over to either side of the vertical plane of the axis of said shaft 42 in order to maintain the said shaft in a position to maintain the clutch 39 engaged with one of said respective gears 36. Suitable stops 39ª are carried by one of said channel bars 1 contiguous to either end thereof and in the path of said lever 44 so that as the carriage of the machine approaches either limit of its travel the said shaft 42 will be automatically turned to throw the clutch 39 out of engagement with the clutch member 40 theretofore engaged thereby thus bringing said carriage to a standstill. The said shaft 37 carries a spur pinion 46 which meshes with a spur gear 47 on a vertical shaft 48, the latter being journaled in a sleeve bearing 49 secured to said gear box 32 and supported by the latter. The said spur gear 47 is loose on said shaft 48 and the hub thereof constitutes a spur pinion 50 which meshes with a spur gear 51 rotatably mounted upon the upper bearing of the gear box 32 in which said shaft 37 is journaled and is thus rotatable on an axis concentric with that of said shaft 37. The hub of said spur gear 51 also constitutes a spur pinion 52 which meshes with the spur gear 53 rigid with said shaft 48 and which drives the latter. The train of gears above described serves to impart very slow rotation to said shaft 48 as will be obvious, and it may be readily increased or diminished to vary the speed of rotation of the helices relative to the speed of travel of the carriage, which is very advantageous and important. The shaft 48 carries a bevel pinion 54 at its lower end which meshes with a bevel gear 55 on a horizontal shaft 56 journaled in suitable bearings carried by the contiguous channel bar 5 and which extends substantially the entire length of the carriage.

The importance of easily enabling the relative speeds of travel of the carriage and rotation of the helices in inverse ratio will be more fully appreciated when it is considered that malting compartments differ materially in width and that accordingly the resistance to movement of the carriage varies also, becoming greater as the width of the compartment increases. If the helix makes one revolution for each inch of travel of the carriage or makes two revolutions in the same intervals makes a vast difference in resistance, becoming less as the speed of rotation of the helices increases because the latter loosen the body of malt more thoroughly. It is, therefore, important that the gearing employed should readily adapt itself to variation at small cost and trouble so that the relative speeds of the parts mentioned may be easily adapted to the particular conditions pertaining in each case. At both its ends said shaft 56 carries a spur gear 57 which meshes with the spur gear 3 meshing with the rack 2 carried by the channel bars 1 for causing the carriage to travel upon the last-named channel bars. The gearing last described is also inclosed in suitable gear boxes for the purpose of protecting the same against the moisture present in all malt houses and further to prevent dripping of oil or grease into the compartments containing the malt.

In turning or stirring and agitating barley or other grain in process of germination it is not only wet and thus inclined to lump from this cause but the sprouts shooting therefrom entangle themselves with each other and with the contiguous kernels so that the tendency and power to form big lumps is greatly enhanced. This tendency to form lumps is a source of considerable annoyance inasmuch as frequently a large lump or ball of germinated grain becomes caught in the helices and is rotated with the latter thus greatly increasing the resistance to rotation thereof and diminishing the efficiency of the helices in turning over and stirring the body of the germinated grain. The helices which I have invented and will now proceed to describe are equipped and designed to break up such lumps or balls of germinated grain to prevent the same from being rotated therewith.

Secured to each of the vertical shafts 27 there are secured at different elevations collars 57ª each of which is equipped with an arm 58, the latter being curved and presenting a convex edge in the direction of rotation of said shaft. At the lower end of each of said shafts 27 there is mounted a collar 59 carrying an arm or foot-piece 60 which is also curved and presents a convex edge in the direction of rotation of the helix. The outer end of said arm 58 carries a projection 61 which is disposed concentric with the shaft 27 and is provided in its upper face with a recess which receives one end of the helix 62, the latter being suitably secured by means of rivets. Between each of the arms 58 of said collars 57ª and the lower face of the helix 62 there is mounted a separator sleeve 63 through which the bolt 64 or other fastening device securing said helix to the arms 58 is adapted to pass. The several arms 58, any desired number of which may be employed, are thus maintained separated from the helix by a space sufficiently deep to prevent the formation at the juncture of the tube of a corner in which a ball or lump of the moist germinating grain is adapted to be caught and held so as to rotate with said helix. The latter consists of a strip of relatively heavy steel bent to helical form, as shown. The curvature of the arms 58 and of the front edge of the foot piece 60 tends to cause the grain contacting with said convex edges to move outwardly toward the helix so that the action of the device throughout is to cause the grain to be raised and turned over and moved outwardly from the shaft toward the helices so that all portions of the grain in the compartment will be fully agitated and loosened up to permit air to pass therethrough.

The formation of the aforesaid balls or lumps of malt and the lodgment thereof in the helices is a source of serious trouble for several reasons inasmuch as they prevent proper loosening up and stirring of the malt by the helices, greatly increase the resistance to their rotation and because of insufficient stirring and agitation of the malt increase the resistance to travel of the carriage.

I claim as my invention:

1. In a malt turning machine, the combination with a plurality of helix shafts, a drive shaft common to all of the same, and bearings for said drive shaft disposed in vertical alinement with said helix shafts, of bevel gearing between said drive shaft and said helix shafts, and gear boxes for said gearing and said bearings, said bearings supported in said boxes, and said boxes free to turn on their pivots, substantially as and for the purpose specified.

2. In a malt turning machine, the combination with a plurality of helix shafts, gear-boxes pivotally mounted concentric therewith and into which said shafts project at their upper ends, a drive-shaft passing laterally through said gear-boxes, gearing within the latter between said drive-shaft and the respective helix shafts, and bearings for said drive shaft within and supported by said gear boxes, said bearings disposed in vertical alinement with said gear boxes and adapted to turn with the latter as said drive shaft yields to excessive strain in driving said helix shafts, substantially as and for the purpose specified.

3. In a malt turning machine, the combination with a carriage movable on a way, rackbars on said way, spur gears on the carriage meshing therewith for causing the carriage to travel on said way, of a drive shaft on said carriage, a countershaft carrying said spur gears, a plurality of countershafts between the said drive shaft and spur gear shaft, and a train of spur gears on said last-named countershafts for transmitting movement of said drive shaft to said spur-gear shaft, said countershaft arranged to permit said gear train to be varied in number to vary the relative speeds of rotation of said drive shaft and said spur gear shaft.

4. In a malt-turning machine, the combination with a carriage movable on ways, rackbars on said ways, spur gears on said carriage meshing therewith for causing the carriage to travel on said ways, a plurality of helix carrying shafts on said carriage, a drive shaft on the latter, a counter-shaft geared to said helix shafts for rotating the latter, gearing between said drive shaft and said countershaft, a second countershaft carrying said spur gears, and a variable gear train between said drive-shaft and said last-named countershaft for varying its speed relative to said drive shaft thereby to vary the speed of travel of the carriage relatively to the speed of rotation of said helix shafts, substantially as and for the purpose specified.

5. In a malt turning machine, malt turning means comprising a vertically disposed shaft, a member projecting outwardly therefrom at its lower end, a helical member disposed concentric with said shaft and secured at one end to the said member, a plurality of supporting arms for said helical member secured to said shaft at different elevations, and having their free ends disposed below said helical member at different points, separators interposed between the said free ends of said arms and the lower face of said helical member, and means securing the latter to the former.

6. In a malt turning machine, malt turning means comprising a vertically disposed shaft, a member projecting outwardly therefrom at its lower end, a helical member disposed concentric with said shaft and secured at one end to the said member, a plurality of supporting arms for said helical member secured to said shaft at different elevations, and projecting in various directions therefrom, the free ends of said arms disposed below said helical member at different points, separators interposed between the said free ends of said arms and the lower face of said helical member, and means securing the latter to the former.

7. In a malt turning machine, malt turning means comprising a vertically disposed shaft, a member projecting outwardly therefrom at its lower end, and having an inclined upper face, a helical member disposed concentric with said shaft and secured at one end to the said member, there being a free annular space between said helical member and said shaft, arms projecting from the latter at different elevations and spanning said annular space, the outer ends of said arms disposed below the lower face of the helical member at respectively different points, separator sleeves interposed between the outer ends of said arms and said helical member, and fastening means securing the latter to said arms and passing through said sleeves.

In testimony whereof I have signed my name in presence of two subscribing witnesses.

JOHN F. DORNFELD.

Witnesses:
RUDOLPH WM. LOTZ,
M. M. BOYLE.